Patented Oct. 5, 1948

2,450,498

UNITED STATES PATENT OFFICE 2,450,498

ETHERS OF 1-METHYLOLCYCLOHEXYL-CYCLOHEXYL-CARBINOL

Joseph E. Bludworth, Corpus Christi, Tex., and Donald P. Easter, Washington, D. C., assignors to Celanese Corporation of America, a corporation of Delaware No Drawing. Original application January 22, 1944, Serial No. 519,352, now Patent No. 2,410,007, dated October 29, 1946. Divided and this application July 18, 1946, Serial No. 684,542

2 Claims. (Cl. 260—611)

This invention relates to novel organic compounds and relates more particularly to the ethers of 1-methylolcyclohexyl-cyclohexyl-carbinol.

This application is a division of U. S. application S. No. 519,352, filed January 22, 1944 and S. No. 568,784, filed December 18, 1944, which have issued as Patents Nos. 2,410,007 and 2,426,162, respectively.

An object of our invention is the preparation of the ethers of the methylolcyclohexyl hydrogenation products of $\Delta^3$-tetrahydrobenzaldol.

Another object of our invention is the utilization of said novel ether compounds as plasticizing agents, dispersing agents, and the like.

Other objects of our invention will appear from the following detailed description.

The reaction of acrolein with butadiene in accordance with the Diels-Alder condensation yields $\Delta^3$-tetrahydrobenzaldehyde,

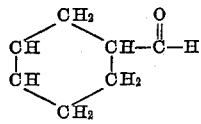

This cyclic aldehyde is quite reactive and, as a starting material, may be employed as a fertile source of novel and valuable synthetic organic materials.

We have now discovered that novel and valuable ethers may be obtained by etherifying the hydrogenated aldol condensation product of $\Delta^3$-tetrahydrobenzaldehyde. The aldol condensation of $\Delta^3$-tetrahydrobenzaldehyde yields the aldol condensation product, $\Delta^3$-tetrahydrobenzaldol having the following structural formula,

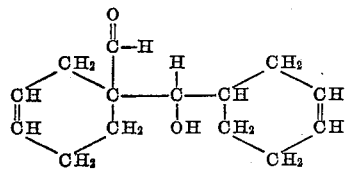

On hydrogenation, this compound yields the polynuclear compound, 1-methylolcyclohexyl-cyclohexyl-carbinol:

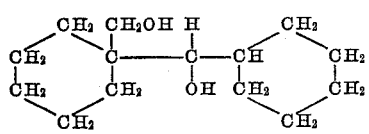

which may, as stated, be etherified with a suitable etherifying medium.

The novel compounds of our invention have the following general formula:

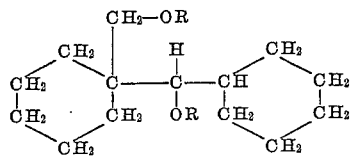

wherein R is an alkyl, unsaturated alkyl, cycloalkyl, alkaryl, aralkyl, aryl, or heterocyclic radical. By adjusting the mol ratio of etherifying agent to the 1-methylolcyclohexyl-cyclohexyl-carbinol, we may etherify but one of the hydroxy groups and the mono-ethers of 1-methylolcyclohexyl-cyclohexyl-carbinol may thus be obtained.

In forming the novel ethers of 1-methylolcyclohexyl-cyclohexyl-carbinol in accordance with our invention, R may be the residue of a hydroxy compound, viz. alcohols, such as, for example, methyl, ethyl, propyl, iso-propyl, butyl, sec. butyl, acetyl, ethylene chlorohydrin, benzyl, lauryl, stearyl, cyclohexyl, furfuryl, abietyl alcohol, or ethylene glycol, propylene glycol, phenol, cresol, pyrazolone and hydroxy-pyridine. The etherification of 1-methylolcyclohexyl-cyclohexyl-carbinol may be effected conveniently employing suitable etherifying agents and etherification procedures.

In order further to illustrate our invention but without being limited thereto the following example is given:

Example

To 226 parts by weight of 1-methylolcyclohexyl-cyclohexyl-carbinol in solution in 500 parts diethyl ether is gradually added 46 parts sodium in ribbon form. After the reaction has subsided, 126 parts dimethyl sulfate is added with stirring at such a rate as to keep the mixture briskly refluxing. When the addition of dimethyl sulfate has been completed, the mixture is refluxed in a water bath for twenty-four hours, then washed three times with twice its volume of water. The ether solution is dried with anhydrous sodium sulfate and filtered. The ether is then evaporated off, leaving 1-methylolcyclohexyl-cyclohexyl-carbinol dimethyl ether.

The valuable $\Delta^3$-tetrahydrobenzaldol may also be oxidized to yield high molecular weight acids which may be employed in the synthesis of various other high molecular weight derivatives.

It is to be understood that the foregoing detailed description is given merely by way of illustration and that many variations may be made therein without departing from the spirit of our invention.

Having described our invention, what we desire to secure by Letters Patent is:

1. Compounds of the following general formula:

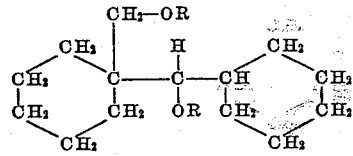

wherein R is a member of the group consisting of alkyl, and monocyclic aryl radicals.

2. 1 - methylolcyclohexyl - cyclohexyl-carbinol dimethyl ether.

JOSEPH E. BLUDWORTH.
DONALD P. EASTER.

REFERENCES CITED

The following references are of record in the file of this patent:

UNITED STATES PATENTS

| Number | Name | Date |
| --- | --- | --- |
| 2,410,007 | Bludworth et al. | Oct. 29, 1946 |